June 18, 1935.  W. DUDLEY  2,005,579
ELECTRICALLY WELDING PIPE
Filed Aug. 28, 1933
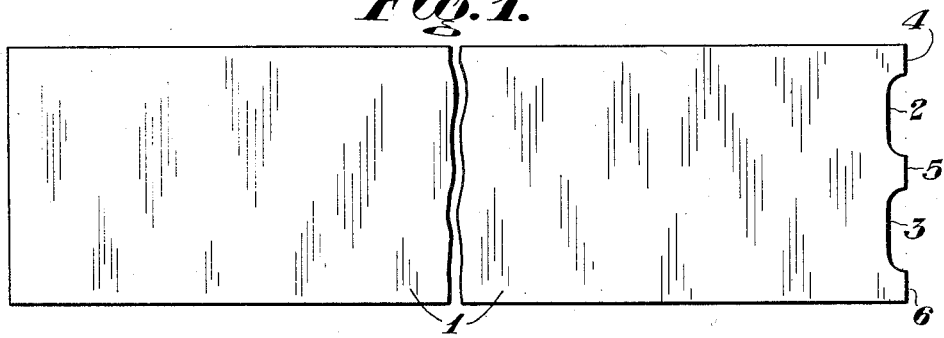
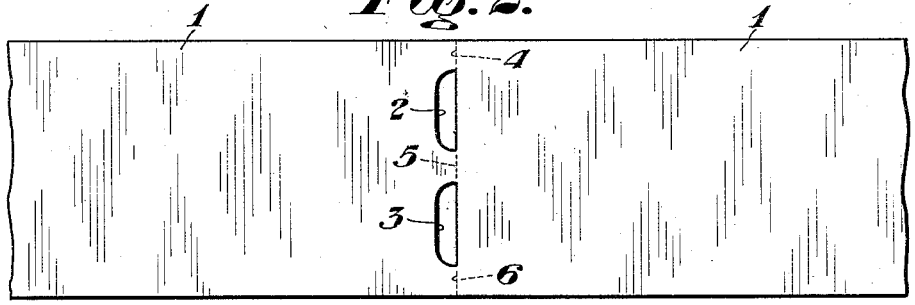
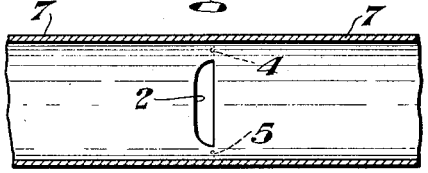 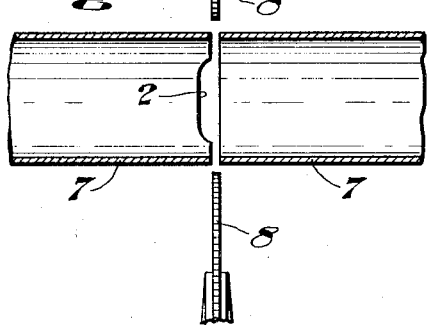
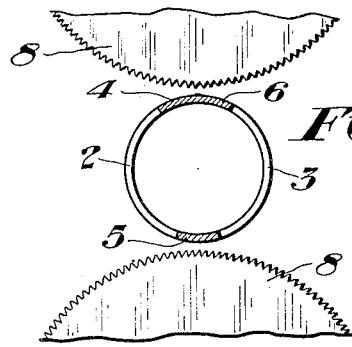
Inventor:
WRAY DUDLEY,
by: *Heims & Lauter*
his Attorneys.

Patented June 18, 1935

2,005,579

UNITED STATES PATENT OFFICE 2,005,579

ELECTRICALLY WELDING PIPE

Wray Dudley, Mount Lebanon Borough, Pa., assignor to National Tube Company, a corporation of New Jersey Application August 28, 1933, Serial No. 687,185

2 Claims. (Cl. 219—10)

This invention relates to the manufacture of pipe from skelp by continuous welding methods.

It is now possible to thus manufacture rather long lengths of welded pipe in small diameters by using coils of strip stock. These long lengths are desirable because of the reduction of waste always resulting at the start and finish of interrupted welding operations.

Such waste is particularly prevalent in connection with the continuous electric welding of pipes because of delay in applying the welding current at the start and the interrupting of its flow before the finish, this being necessary to avoid serious burning of the pipe ends or damage to the welding equipment. Resulting temporarily incorrect values of welding current further increase the waste. However, flame welding methods also involve such waste.

It has generally been considered impractical to produce long lengths of pipe in the larger diameters. This is because such pipe is manufactured from skelp which cannot be practically rolled in long lengths and is too heavy to permit its coiling in any event. A further difficulty is the lack of suitable equipment capable of cutting such large heavy pipe on the fly, this naturally being necessary if the pipe is to be continuously produced.

By welding the ends of conventional skelp lengths together a continuous production of electrically welded pipe can be attained. This overcomes the difficulty of producing adequate skelp lengths, but there still remains the fact that it is impractical to cut the heavy pipe while moving at its welding speed rate. It is naturally necessary to keep the pipe within such limits of length as will make its handling in the ordinary mill possible.

Therefore, one of the objects of this inventor is to provide a method for manufacturing large diameters of pipe by continuous welding methods, which overcomes the above objections. An associated object is the provision of a skelp particularly suited for use with such methods. Other objects may be inferred from the following disclosure of a specific example of the invention.

Generally speaking, the invention is characterized in that each of a plurality of skelp lengths has one or both of its ends provided with recesses which terminate adjacent its side edges. These lengths are then fastened end to end, prior to passage through a conventional forming and welding machine, so that a laterally slotted structure or skelp having continuous side edge portions results. This structure is then continuously formed and welded so that a continuous production of circumferentially slotted pipe results, which is possible because there is no break in the skelp's side edge portions.

It follows that it is possible to effect a continuous production of pipe which constitutes lengths joined at localized points in line with the weld. Manufacturers have assured this inventor that it is possible for them to produce saws which travel with the pipe and cut such localized junctions. This produces the lengths desired and also permits inspection of the weld, since the latter must also be cut. This last feature further reduces waste. Other cutting means might obviously be used.

Figure 1 is a plan of the new skelp.

Figure 2 is a plan of the new skelp when joined end to end.

Figure 3 is a longitudinal cross-section of the resulting pipe.

Figure 4 shows the pipe after cutting.

Figure 5 is a lateral cross-section and shows the pipe about to be cut.

This drawing illustrates one form of skelp, showing a length having one of its ends right angular and provided with spaced recesses 2 and 3 bounded by projections 4, 5 and 6, and its other end right angular and unrecessed. The projections 4 and 6 are located adjacent the side edges of the skelp while the projection 5 is adjacent the skelp's center, each projection representing the termination of the recess bounded by the same. Each skelp length may be butt-welded to the straight right angular end of the next by suitable apparatus, as is illustrated by Figure 2. This welding may be done while the lengths are continuously passing through the pipe making machine.

It is to be understood that the machine, which has been generally referred to, may be of the conventional continuous type which bends the skelp to pipe form and then electrically or flame welds it. These operations may be performed by separate machines. Although the skelp may be welded by other means it is the electric welding method which brings the invention's advantages to prominence.

When the skelp is thus welded end to end a structure results which has two lateral slots at these junctions, which extend throughout the majority of the skelp's width, and which has continuous side edges.

The pipe 7, as produced by the welding machine, is circumferentially slotted and joined in a continuous length only at the localized points formed by the projections 4, 5 and 6. The projections 4 and 6 will of course be proximate and will include the longitudinal weld, while the projection 5 will be diagonally opposite these.

These junction points provide adequate strength to permit the machine's handling the skelp in its intended manner, and also form paths for the welding current so its interruption is unnecessary. At the same time, when shallow cuts are made in these localized joining points the pipe will be severed as it leaves the machine, so that easily handled lengths result. This also exposes transverse sections of the weld. Such a severance is illustrated by Figure 4 which shows saw blades 8 just leaving the pipe after performing their function.

The recesses 2 and 3 may be of such depth that exact registration of the saw blades is not absolutely necessary. They may be formed by cutting, punching or any other method which proves desirable. Should it be found that one junction point provides sufficient strength for passage through the skelp forming and welding machine, the projection 5 may be eliminated and the recesses 2 and 3 joined so there is but one large recess. It is then necessary to make but one cut to sever the pipe into the desired lengths. Further, a single length of skelp might be laterally slotted at longitudinally spaced points to produce a structure having continuous edges.

The foregoing may be summarized by saying that the invention consists in making a pipe by producing lengths of laterally slotted skelp with continuous side edge portions, which may be formed by welding together a series of skelp lengths having recesses in their ends which terminate adjacent their side edges, then in passing this slotted skelp through a machine which shapes it to pipe form and welds its continuous edges together to produce circumferentially slotted pipe and, finally, in reducing this pipe to easily handled lengths by cutting through at portions which are circumferentially adjacent its slots.

It is to be understood that skelp is sometimes called plate, that pipes are sometimes called tubes and that the above summary of the invention is not intended to limit the invention exactly thereto, except as defined by the following claims.

I claim:

1. A method of manufacturing pipe by continuous welding methods, including producing laterally slotted skelp having continuous side edge portions, shaping and welding said skelp so as to effect a continuous production of circumferentially slotted pipe and then cutting the portions of said pipe circumferentially separating its slots.

2. A method of manufacturing pipe by continuous welding methods, including producing a plurality of skelp lengths having their ends provided with recesses which terminate adjacent their side edges, welding said lengths end to end so that a laterally slotted skelp having continuous side edge portions results, shaping and welding the second named skelp so as to effect a continuous production of circumferentially slotted pipe and then cutting the portions of said pipe circumferentially separating its slots.

WRAY DUDLEY.